Feb. 23, 1965  W. B. SHRODE  3,170,334
REMOTE CONTROL MIRROR
Filed Nov. 8, 1961  2 Sheets-Sheet 1
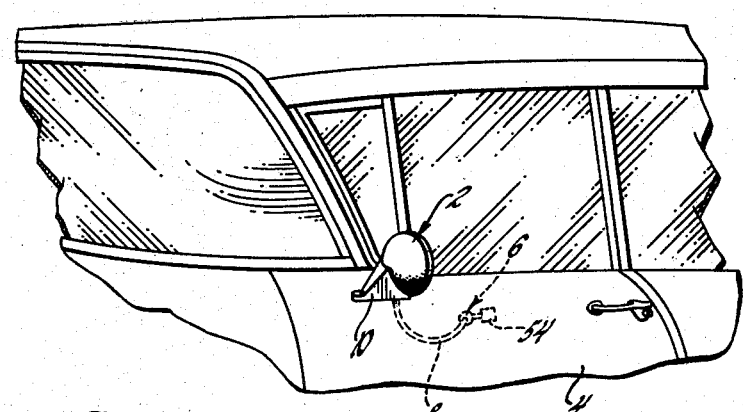
Fig. 1
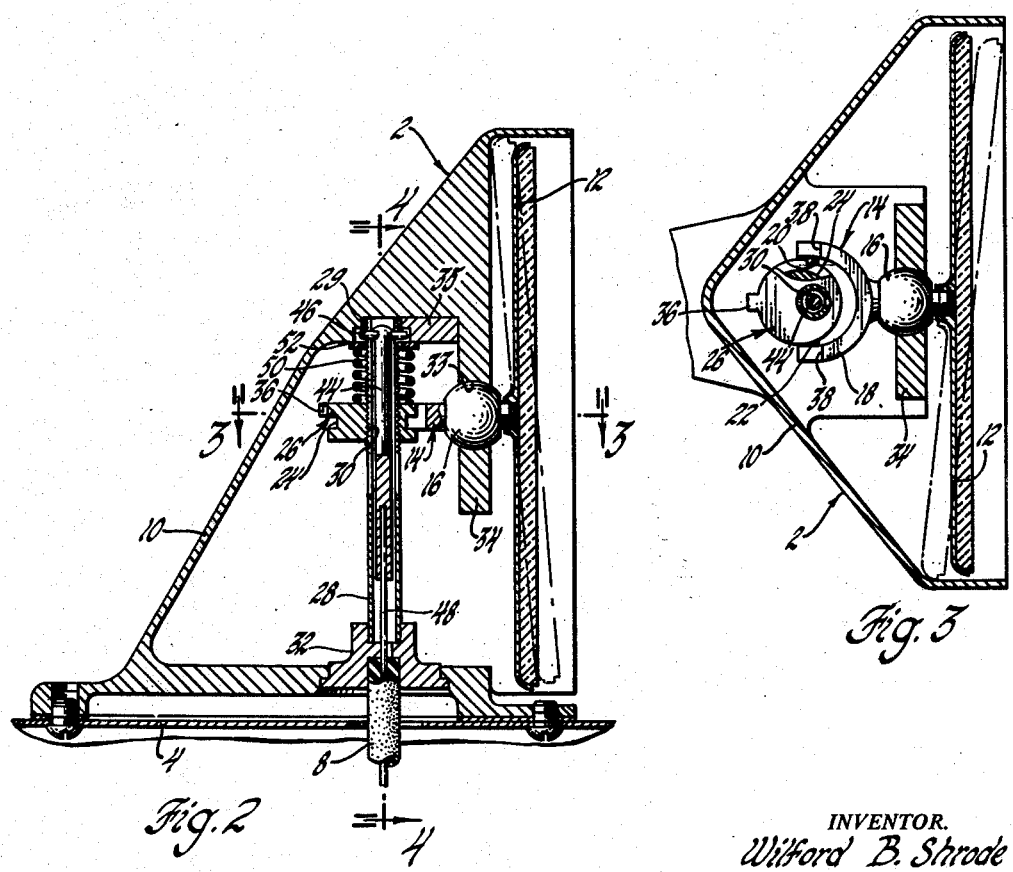
Fig. 2
Fig. 3
INVENTOR.
Wilford B. Shrode
BY
Paul J. Reising
ATTORNEY Feb. 23, 1965   W. B. SHRODE   3,170,334
REMOTE CONTROL MIRROR
Filed Nov. 8, 1961   2 Sheets-Sheet 2

INVENTOR.
Wilford B. Shrode
BY
Paul J. Reising
ATTORNEY 3,170,334
REMOTE CONTROL MIRROR
Wilford B. Shrode, Huntington Woods, Mich., assignor to General Motors Corporation, Detroit, Mich., a corporation of Delaware
Filed Nov. 8, 1961, Ser. No. 151,101
9 Claims. (Cl. 74—96)

This invention relates to a rear view mirror that may be mounted exteriorly on an automotive vehicle and is particularly concerned with the mechanism for remotely controlling the position of the mirror.

One object of the present invention is to provide an adjustable mirror having operating mechanism that is both reliable and of durable construction, and provides a positive drive to be transmitted to the mirror from a remotely located actuator.

Another object of this invention is to provide a mirror that is adjustable about mutually perpendicular first and second pivot axes with the adjustment being made by a single cable connected to a remotely located actuator associated with mechanism that provides a pivotal movement of the support about the first axis when the actuator is rotated and a pivotal movement about the second axis when the actuator is shifted axially followed by a rotation of the actuator.

The above and other objects are accomplished with a mirror structure having a mounting bracket universally pivotally supporting a mirror support that is connected through an eccentric cam to a threaded control tube. A T member coacts with the control tube for rotating the latter so as to cause a movement of the cam along the control tube and thereby position the mirror about a first pivot axis. Means are also provided for shifting the T member to a position that causes an expansion of the control tube with the result that the cam is locked to the tube and both rotate as a unit thereby causing an additional adjustment of the mirror assembly about a second pivot axis. A remotely located actuator includes a rotatable shiftable knob that is connected to the T member through a cable and is adapted to direct drive to the former to obtain selective adjustment of the mirror support about the two pivot axes.

A more complete understanding of my invention can be derived from the following detailed description taken in conjunction with the drawings, in which:

FIGURE 1 shows the subject mirror structure incorporated with a vehicle;

FIGURE 2 is an enlarged vertical sectional view of the rear view mirror parallel to the length of the vehicle illustrating the operating components;

FIGURE 3 is a section taken on lines 3—3 of FIGURE 2;

Figure 4:
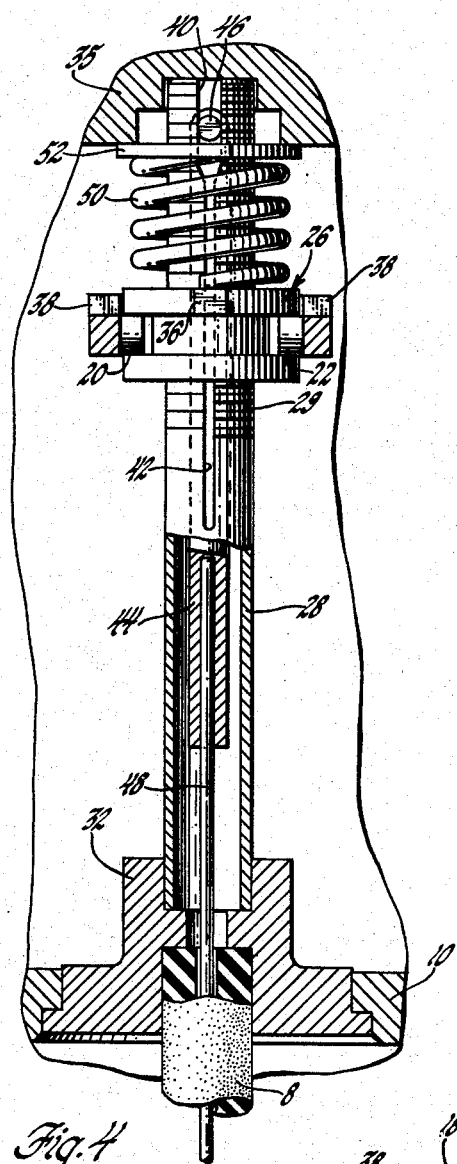
FIGURE 4 is an enlarged view partly in section taken on lines 4—4 of FIGURE 2.

Referring now to the drawings and particularly FIGURE 1, a mirror structure 2 is shown exteriorly mounted on a vehicle door 4 with an actuator 6 secured inside of the vehicle on the door panel, and operatively connected with the mirror 2 through a cable or Bowden wire 8, comprising the usual sheath and wire components.

Figure 6:
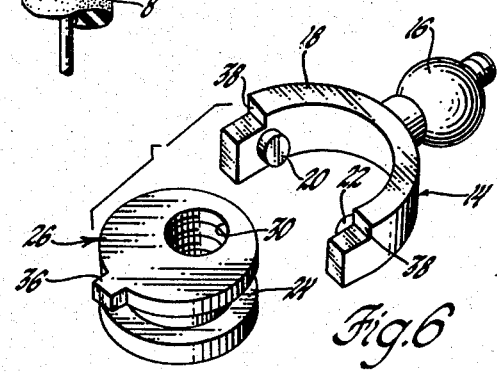
FIGURE 6 is a perspective view of a cam and yoke member incorporated with the subject invention.

As best seen in FIGURE 2, the mirror structure 2 comprises a mounting bracket 10 fastened to the door 4 and includes a mirror support 12 secured to one end of a yoke member 14. The bracket 10 includes an integrally formed collar 34 that is rectangular in cross-section and has a spherical bearing surface 33 formed therein for universally supporting a ball portion 16 of the yoke member about mutually perpendicular pivot axes. As shown in FIGURE 6, the yoke member includes a fork 18 having a pair of pivot points 20 and 22 projecting inwardly from the opposite arms of the fork and adapted to be accommodated by an annular slot 24 formed in a circular cam member 26. A control tube 28 has the upper portion 29 thereof externally threaded and passes through an eccentrically disposed threaded bore 30 formed in the cam member. The control tube is rotatably supported in the bracket about a vertical axis by a plug 32 at one end and a block 35 at the other end. A stop 36 projects from the periphery of the cam to limit rotation thereof about the bore axis by engaging suitably notched portions 38 formed on the yoke 14. The upper portion of the control tube 28 is split into two adjoining portions along the longitudinal axis of the tube by a slot having an enlarged opening 40 connecting with a narrower opening 42. A T shaped drive shaft 44 is located in the control tube 28 and includes a cross arm 46 forming a key that slidably supports one end of the shaft 44 within the slot opening 40, with the other end of the shaft connected to a wire or cable 48. A coil spring 50 surrounds the upper portion of the control tube with one end seated on the upper surface of the cam member 26 and the other end biasing a washer 52, which in turn, supports the cross arm 46 of the drive shaft. The free end of the wire 48 is connected to an actuator knob 54 that serves to rotate the drive shaft 44 and, in addition, provides for shifting the cross arm 46 within the control tube slot for purposes which will hereinafter be explained.

During operation, rotation of the actuator knob 54 results in a corresponding rotation of the drive shaft 44 and, due to the connection between the cross arm 46 and the tube slot 40, a similar rotation of the control tube 28 occurs. As the control tube 28 rotates, the cam 26 moves along the control tube in an upward or downward direction depending upon the direction of rotation of the tube, and this movement pivots the mirror support 12 up or down about a horizontal pivot axis through the pivot points 20 and 22 on the yoke 14. The cam moves along the shaft because of the spring 50 exerting a frictional restraining force on the upper surface of the cam so as to prevent its rotation. In the event that the restraining force supplied by the spring is unable to prevent rotation of the cam because of lack of lubricant or other reason, positive restraining means such as the stop 36 formed with the cam would limit rotation of cam upon engaging the portion 38 of the yoke member. Thereafter, continual rotation of the tube would thread the cam along the former for attaining the desired adjustment.

Figure 5:
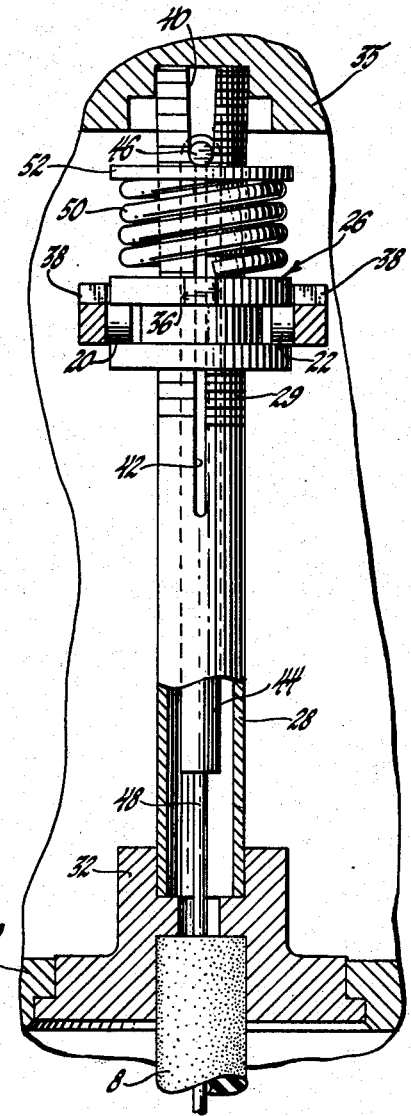
FIGURE 5 illustrates the mechanism of FIGURE 4 with parts thereof repositioned.

To turn the mirror support sidewise about a vertical pivot axis, the actuator knob 54 is first pulled toward the operator and then rotated. The pull draws the wire 48 and shifts the associated drive shaft 44 and washer 52 in a downward position against the bias of the spring 50, as shown in FIGURE 5, thereby wedging the cross arm 46 into the narrow slot opening 42. This movement serves to separate the split portions of the control tube 28 and cause a wedging action between the latter and the threaded bore 30 in the cam 26 with the result that the cam is fixed to the control tube 28 for unitary movement therewith. Thereupon, rotation of the actuator knob 54 causes rotation of both the control tube 28 and the cam 26, and because the cam is eccentrically mounted on the control tube, serves to move the yoke 14 to turn the mirror support sidewise. Upon release of the actuator knob, the spring 50 returns the shaft 44 to its normal position, as shown in FIGURE 4.

Having disclosed a preferred embodiment for the purposes of illustration, it is to be understood that the invention is not to be limited thereby but only by the appended claims.

What is claimed is:

1. A remote control mirror mechanism comprising, a mounting bracket, a mirror support, first means supporting said mirror support and connected to said mounting bracket for movement about mutually perpendicular first and second axes, second means for moving said first means and mirror support about said axes, third means threaded into the second means, fourth means normally restraining movement of the second means so that relative rotation of said third means with respect to the second means moves said second means along said third means to pivot the mirror support about said first pivot axis, and means for locking said second means to the third means in all positions of said second means so that rotation of said third means moves the second means transverse to the second axis to pivot said support about the second pivot axis.

2. A remotely controlled mirror mechanism comprising, a mounting bracket, a mirror support, first means mounting said mirror support and connected to said mounting bracket for movement about mutually perpendicular first and second pivot axes, an eccentric cam for coacting with said means for pivoting said means and mirror support about said first axis, a tube threaded into the eccentric cam, means normally restraining movement of the cam so that relative rotation of said tube moves said cam along said tube to pivot the mirror support about said first pivot axis, and drive means for rotating the tube, means formed on the drive means for rotationally locking said tube to said cam so that rotation of said tube turns the cam to pivot the mirror support about the second pivot axis.

3. A remotely controlled mirror mechanism comprising a mounting bracket, a mirror support, first means mounting said mirror support and connected to said mounting bracket for movement about mutually perpendicular first and second pivot axes, an eccentric cam supporting said first means, a control tube connected to said eccentric cam, means permitting rotative movement of said tube relative to the cam so as to cause pivotal movement of said mirror support about said first pivot axis, drive means connected to said tube, means including said drive means for locking said cam to said control tube so that rotative movement of the tube turns said cam to pivot said mirror support about said second pivot axis, and an actuator connected to the drive means.

4. A remotely controlled mirror mechanism, comprising a mounting bracket, a first member supported by the bracket about mutually perpendicular first and second pivot axes, a mirror support rigidly connected to one end of said first member, a second member operatively connected with the other end of said first member, a rotatable control member threadably supporting said second member, a drive shaft supported by said control member, an actuator connected to said drive shaft for shifting the latter between a first and second position, means engaging said second member and restraining movement thereof when said drive shaft is in one of said positions so that rotation of the drive shaft causes movement of the second member along the control member to pivot said mirror support about said first axis, said drive shaft acting to lock said second member to said control member when in the second of said positions so that rotation of said drive shaft causes the mirror support to pivot about the second axis.

5. A remotely controlled mirror mechanism, comprising a mounting bracket, a member supported by said bracket for movement about mutually perpendicular first and second pivot axes, a mirror support rigidly connected to one end of said member, a cam operatively connected with the other end of said member, a rotatable control member threadably supporting said cam, a drive shaft supported by said control member, an actuator connected to said drive shaft for shifting the latter between a first and second position, means engaging said cam and restraining movement thereof when said drive shaft is in one of said positions so that rotation of the drive shaft causes movement of the cam along the control member to pivot said mirror support about said first axis, said drive shaft acting to lock said cam to said control member when in the second of said positions so that rotation of said drive shaft causes the mirror support to pivot about the second axis.

6. A remotely controlled mirror mechanism, comprising a mounting bracket, a yoke member supported by said mounting bracket for movement about mutually perpendicular first and second pivot axes, a mirror support rigidly connected to one end of said yoke member, an eccentric cam operatively connected with the other end of said yoke member, a rotatable control tube threadably supporting said cam, a drive shaft supported by said control tube, an actuator connected to said drive shaft for shifting the latter between a first and second position, means engaging said cam and restraining movement thereof when said drive shaft is in one of said positions so that rotation of the drive shaft causes movement of the cam along the tube to pivot said mirror support about said first axis, said drive shaft acting to lock said cam to said control tube when in the second of said positions so that rotation of said drive shaft causes the mirror support to pivot about the second axis.

7. A remotely controlled mirror mechanism, comprising a mounting bracket, a spherical bearing surface formed in said mounting bracket, a yoke member having a ball portion for seating in said bearing surface so as to provide for movement of said yoke member about mutually perpendicular first and second pivot axes, a mirror support rigidly connected to one end of said yoke member, an eccentric cam operatively connected with the other end of said yoke member, a rotatable control tube threadably supporting said cam, a drive shaft having a cross arm, a slot in said control tube supporting said cross arm, an actuator connected to said drive shaft for shifting the latter so that said cross arm has a first and second position in said slot, spring means biasing said cam and restraining movement thereof when said cross arm is in one of said positions so that rotation of the drive shaft causes movement of the cam along the tube to pivot said mirror support about said first axis, said cross arm acting to lock said cam to said control tube when in the second of said positions so that rotation of said drive shaft causes the mirror support to pivot about the second axis.

8. A remotely controlled mirror mechanism, comprising a mounting bracket, a spherical bearing surface formed in said mounting bracket, a yoke member having a ball portion for seating in said bearing surface so as to provide for movement of said yoke member about mutually perpendicular first and second pivot axes, a mirror support rigidly connected to one end of said yoke member, a cam operatively connected with the other end of said yoke member, a rotatable control tube threadably supporting said cam, a drive shaft having a key portion, a slot in said control tube supporting said key portion, an actuator connected to said drive shaft for shifting the latter so that said key portion has a first and second position in said slot, spring means biasing said cam and restraining movement thereof when said key portion is in one of said positions so that rotation of the drive shaft causes movement of the cam along the tube to pivot said mirror support about said first axis, said key portion acting to lock said cam to said control tube when in the second of said positions so that rotation of said drive shaft causes the mirror support to pivot about the second axis.

9. The mechanism of claim 8 wherein said slot is defined by converging walls forming an enlarged opening connecting with a narrower opening, said key portion having a thickness approximating said enlarged opening and is disposed in the enlarged opening in one of said positions of said drive shaft, said key portion being disposed in the narrower opening to expand and bind the control tube to the cam in the other of said positions of said drive shaft.

References Cited in the file of this patent
UNITED STATES PATENTS

| | | |
|---|---|---|
| 1,491,937 | Walker | Apr. 29, 1924 |
| 1,718,421 | Koca et al. | June 25, 1929 |
| 2,319,041 | Crouse | May 11, 1943 |
| 2,614,437 | Meggitt | Oct. 21, 1952 |
| 2,817,005 | Cameron | Dec. 17, 1957 |
| 2,919,599 | Milton et al. | Jan. 5, 1960 |
| 3,000,263 | Milton et al. | Sept. 19, 1961 |